UNITED STATES PATENT OFFICE.

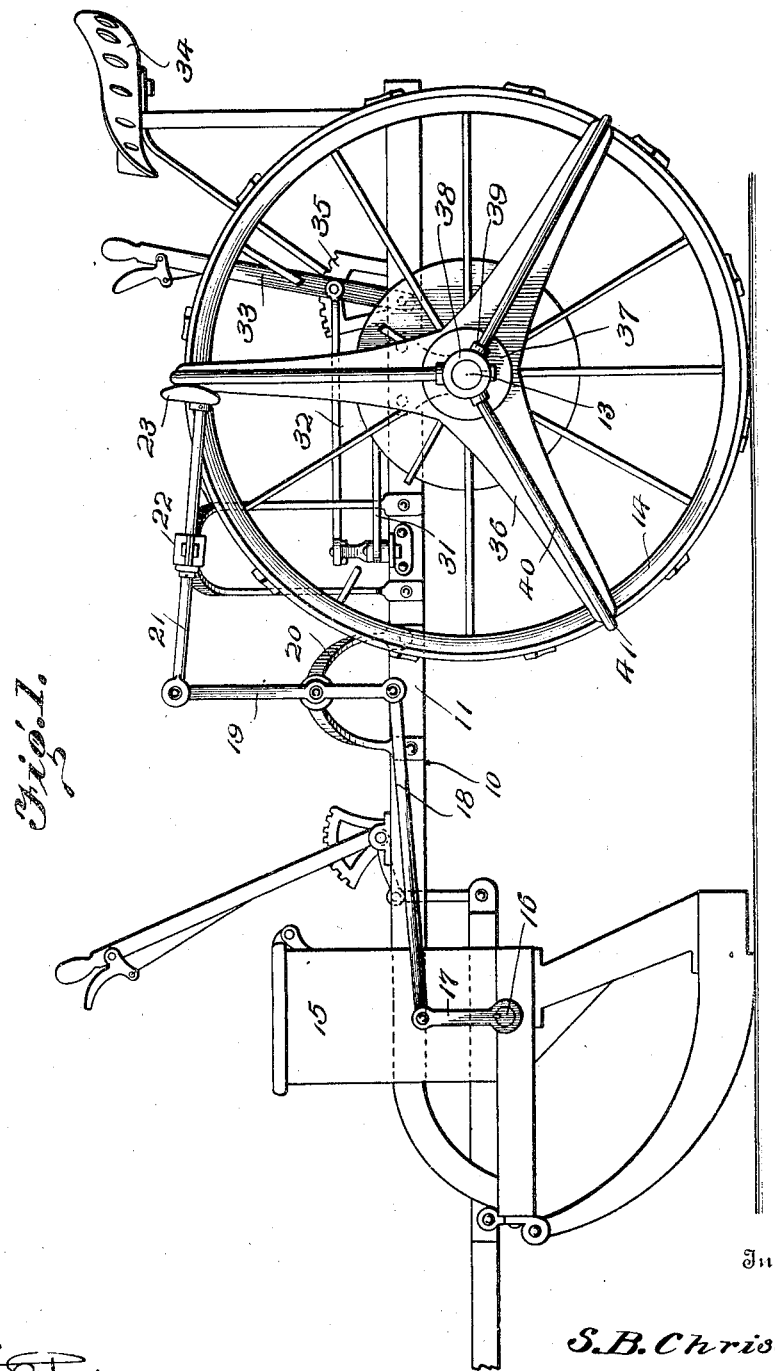

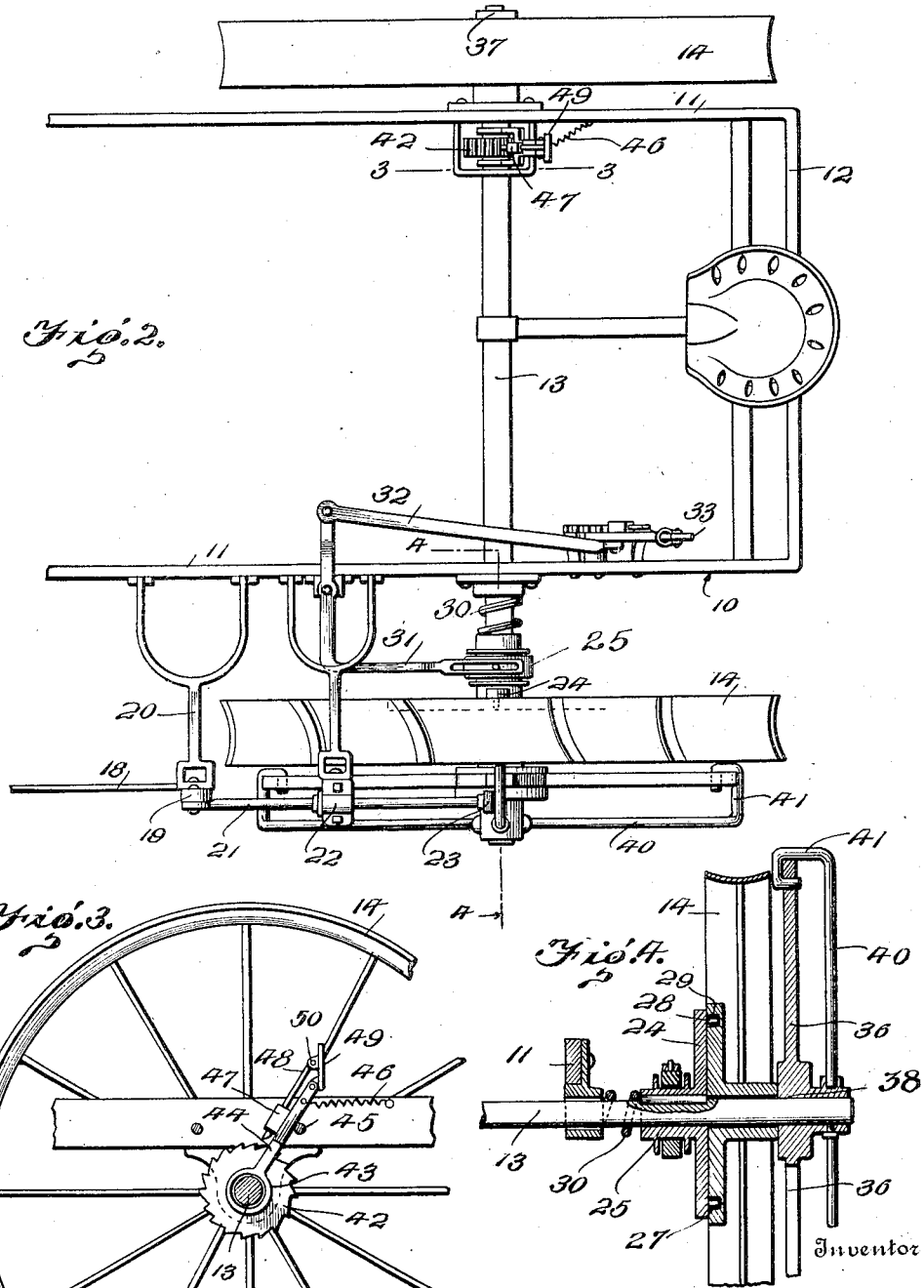

SIGURD B. CHRISTENSEN, OF GRANVILLE, IOWA.

PLANTER.

1,092,241.  Specification of Letters Patent.  Patented Apr. 7, 1914.

Application filed March 25, 1913. Serial No. 756,817.

*To all whom it may concern:*

Be it known that I, SIGURD B. CHRISTENSEN, citizen of the United States, residing at Granville, in the county of Sioux and State of Iowa, have invented certain new and useful Improvements in Planters, of which the following is a specification.

This invention relates to an improvement in corn planters.

The primary object of the invention is to provide a corn planter with a marking mechanism which marks the ground and actuates the seed distributing mechanism.

A further object of the invention is to provide a marking mechanism which is normally idle and which may be clutched to one of the drive wheels of the machine to be operated by said drive wheel.

A still further object of the invention is to provide a construction in which the marker may be conveniently adjusted and set by the operator.

Another object of the invention is to provide a simple and, at the same time, efficient mechanism for transmitting the movement of the markers to the grain delivery mechanism.

Another object of the invention is to arrange the mechanism for clutching the markers to the drive wheel and the mechanism for adjusting the markers where they may be conveniently operated from the seat of the machine.

For a full understanding of the invention, reference is to be had to the following description and accompanying drawings, in which:

Figure 1 is a side elevation; Fig. 2 is a plan view; Fig. 3 is a section on the line 3—3 of Fig. 2; and Fig. 4 is a section on the line 4—4 of Fig. 2.

Corresponding and like parts are referred to in the following description and indicated in all the views of the accompanying drawings by the same reference characters.

In the drawings, 10 designates a frame which consists of the longitudinal bars 11 and the transverse bars 12. An axle 13 is mounted in the frame adjacent its rear end, said axle supporting the drive wheels 14. A seed distributing mechanism 15 is arranged on the forward portion of the frame, said seed distributing mechanism being of any suitable form and being operated by the rocking of the transversely disposed shaft 16. A link 17 is arranged on one terminal of this shaft 16, said link 17 being connected by means of a rod 18 with a lever 19. The lever 19 is pivotally supported by a bracket 20 which is mounted on one of the longitudinal bars of the frame. A rod 21 is supported for reciprocatory movement by a bracket 22 which is supported adjacent the bracket 20 on the bar 11. The terminal of this rod 21 remote from the lever 19 is provided with a trip 23 which, when actuated by means which will be hereinafter described, reciprocates the rod 21 to move the lever 19 on its pivot. When the lever 19 is moved on its pivot, the shaft 16 will be rocked by means of the rod 18 and the link 17. Thus, as the rod 21 is reciprocated, the seed distributing mechanism will be actuated. The drive wheels 14 are loosely mounted on the axle 13, the wheels normally rotating as the machine is moved. A clutch member 24 is splined on the axle, said clutch member consisting of the sleeve 25 and a radially extending portion provided with pins 27 which are disposed to extend within openings 28 formed in the hub portion of one drive wheel 14, as seen most clearly in Fig. 4. A spring 30 is interposed between the longitudinal member 11 of the frame and the sleeve 25, the tendency of said spring being to normally force the clutch member in engagement with the hub of the drive wheel, thereby locking the axle to the drive wheel and causing the same to rotate as the vehicle moves. The sleeve 25 is moved longitudinally of the axle by means of the bell-crank lever 31 which is connected to a link 32. The link 32 is connected to a lever 33 disposed adjacent the seat 34 of the machine, the lever being provided with means engaging a segment 35 to which it may be locked. It will be noted that as the lever 33 is moved, the clutch will be actuated through the link 32 and the bell-crank lever 31.

Arranged on the terminals of the axle are a plurality of radially extending arms 36, these arms being preferably formed integral with a central plate 37 which is fixed to the axle. While in the drawings three arms are illustrated, the number of arms provided is consistent with the diameter of the wheel, the present invention not being limited to the particular number of arms illustrated. Hubs 38 are secured to the axle adjacent each of the plates 37, the hubs being provided with bosses 39 which receive the terminals of rods 40. These rods extend parallel with the arms 36 and their terminals remote from the hub are secured to the outer terminals of the arms, the rods being spaced from the arms throughout their length. Thus the marking surfaces 41 are provided, the terminals of the rods 40 being disposed beyond the wheel rim, contacting with the ground to properly mark the same. It will be noted that the markers will operate only when the axle is clutched to the drive wheel, and that when the machine is not in operation the markers may assume a position where they will not contact with the ground, thus allowing the machine to be driven without actuating either the marking mechanism or the seed distributing mechanism. The trip 23 which is arranged on the terminal of the rod 21 is disposed in the path of the terminals 41 of the rods 40. Thus, when the axle is clutched to the drive wheel 14 and the rods 40 rotate with the drive wheel, the trip 23 will be periodically actuated to reciprocate the rod 21. This reciprocation of the rod 21 will rock the shaft 16 by means of the lever 19 and the links 17 and 18.

The many advantages of a construction of this character will be clearly apparent, as it will be noted that the rods 40 constitute an actuating mechanism for the grain distributing mechanism as well as a marking means. It will be seen that any number of arms 36 may be provided, and the hubs may carry a corresponding number of rods 40. Thus the time of the operation of the distributing mechanism, as well as the spacing of the grain marking means, may be conveniently regulated.

A ratchet wheel 42 is mounted upon the axle, a collar 43 being loosely mounted on the axle adjacent said wheel. This collar supports a lever 44 which is normally maintained in contact with the stop 45, supported by the longitudinal member 11 of the frame remote from that which supports the mechanism for actuating the clutch, by means of a spring 46. A sleeve 47 is mounted on the lever 44. This sleeve receives a reciprocating pawl 48 which is connected to the plate 49, the under face of the plate being formed with spaced ears 50 between which the pawl 48 is pivotally supported. The plate 49 is pivotally mounted on the upper terminal of the lever 44, the plate forming a treadle whereby the foot of the operator may force the pawl 48 in contact with the ratchet wheel and then rock the lever 44 on the axle to rotate the same. By this construction, it will be noted that the axle may be rotated when not clutched to the drive wheel 14 in order that the markers may be adjusted. The markers therefore may be brought out of contact with the ground when it is desired to drive the machine without operating the grain distributing mechanism or the markers.

Attention is called to the fact that the structure is such as may be easily and economically manufactured and that it may be conveniently attached to planter frames now in use without materially altering their construction.

Having thus described the invention what is claimed as new is:

1. A planter including a frame, an axle rotatably mounted on the frame, drive-wheels loosely mounted on said axle, means for clutching the drive-wheels to the axle, arms extending radially from the axle adjacent one of the drive-wheels and projecting beyond the periphery of the said wheel, rods supported by the axle laterally beyond and extending radially in spaced parallel relation to the arms, said rods being terminally bent at right angles and connected to the arms, and a seed-distributing mechanism having a member disposed in the path of and actuated by the bent terminals of the rods.

2. A planter including a frame, an axle rotatably supported by the frame, drive-wheels loosely mounted on said axle, means for clutching the drive-wheel to the axle, a hub mounted on the axle adjacent said wheel and disposed to rotate with the axle, arms extending radially from said hub, rods extending radially from the hub laterally beyond and parallel with the arms, said rods being connected to the arms at their outer terminals, and a seed-distributing mechanism having a member in the path of and actuated by the terminals of said arms and rods.

3. A planter comprising a frame, a seed dropping mechanism mounted thereon and including a rock-shaft mounted upon the frame, a bracket on the frame between the axle and the seed dropping mechanism, a lever fulcrumed on said bracket, a connection between the lower end of said lever and the rock-shaft of said dropping mechanism, a second bracket on the frame between the first mentioned bracket and the axle, means whereby the axle may be rotated, radially disposed marker-arms carried by the axle, and a rod mounted to slide longitudinally in the second bracket and having its front end pivoted to the upper end of the lever and its rear end arranged in the path of the outer ends of said marker-arms.

In testimony whereof I affix my signature in presence of two witnesses.

SIGURD B. CHRISTENSEN. [L.S.]

Witnesses:
   FRANK J. VONDERHARR,
   E. F. TASTOVE.